(12) United States Patent
Leverett, Sr.

(10) Patent No.: US 9,999,294 B2
(45) Date of Patent: Jun. 19, 2018

(54) MULTIPLE WORK SURFACE PULLOUT UNIT

(71) Applicant: David Leverett, Sr., North Augusta, SC (US)

(72) Inventor: David Leverett, Sr., North Augusta, SC (US)

( * ) Notice: Subject to any disclaimer, the term of this patent is extended or adjusted under 35 U.S.C. 154(b) by 0 days. days.

(21) Appl. No.: 15/530,268

(22) Filed: Dec. 16, 2016

(65) Prior Publication Data

US 2017/0172291 A1    Jun. 22, 2017

Related U.S. Application Data

(60) Provisional application No. 62/386,939, filed on Dec. 17, 2015.

(51) Int. Cl.
| | |
|---|---|
| *A47B 7/00* | (2006.01) |
| *A47B 1/05* | (2006.01) |
| *F16C 29/00* | (2006.01) |
| *A47B 1/10* | (2006.01) |
| *A47B 17/03* | (2006.01) |

(52) U.S. Cl.
CPC ............... *A47B 1/05* (2013.01); *A47B 1/10* (2013.01); *A47B 17/03* (2013.01); *F16C 29/008* (2013.01); *F16C 2314/70* (2013.01)

(58) Field of Classification Search
CPC .. A47B 1/05; A47B 1/10; A47B 17/03; F16C 29/008; F16C 2314/70
See application file for complete search history.

(56) References Cited

U.S. PATENT DOCUMENTS

| | | | | |
|---|---|---|---|---|
| 128,439 | A | * 6/1872 | Unna | ..... A47B 88/80 217/7 |
| 468,929 | A | 2/1892 | Cochran | |
| 562,727 | A | 6/1896 | Hooper | |
| 1,870,553 | A | * 8/1932 | Bullen | ..... A47B 17/03 312/233 |
| 2,025,649 | A | 12/1935 | DePoy | |

(Continued)

*Primary Examiner* — Hanh V Tran
(74) *Attorney, Agent, or Firm* — J. Bennett Mullinax, LLC

(57) ABSTRACT

A unique multiple work surface pullout unit that increases space utilization by providing multiple work surfaces for performance of multiple tasks marginally within the space allocated for one. Floors and structural walls, in addition to the framing elements of existing cabinets and counters may provide significant structural support/support frame function for a multiple work surface pullout unit. The multiple work surface pullout unit comprises at least two, generally rectangular in shape, work surfaces of appropriate dimension for the intended use of each work surface; a pair of primary slides and a pair of secondary slides, and means of connecting pairs of slides, identified herein as a pair of rails. Compact size is achieved in part by limiting load-bearing service to the primary slides. Said comprising components are configured and connected such that the work surfaces can move either together as a unit or independently and in either the same or opposite direction. Said pullout unit can be undocked (moved from storage area in the frame) to a useful exposure for a designated task and work surfaces in said pullout unit can be moved independently into and out of the work position for each work surface. Good design will accommodate simultaneous use of work surfaces.

6 Claims, 5 Drawing Sheets

(56) References Cited

U.S. PATENT DOCUMENTS

| | | | |
|---|---|---|---|
| 2,822,229 A | | 8/1954 | Carlson |
| 2,825,617 A | * | 3/1958 | Morgan ............... F25D 25/024 |
| | | | 211/126.15 |
| 3,184,274 A | * | 5/1965 | Mugnier ............... A47B 17/03 |
| | | | 312/196 |
| 3,401,922 A | | 9/1968 | Benson |
| 4,370,007 A | | 1/1983 | Fler |
| 4,933,786 A | | 6/1990 | Wilson |
| 4,993,786 A | * | 2/1991 | De Giulio ............. A47B 88/90 |
| | | | 211/162 |
| 5,044,059 A | * | 9/1991 | De Giulio ............. A47B 88/90 |
| | | | 211/151 |
| 5,248,192 A | * | 9/1993 | Tazzia ................... A47B 17/03 |
| | | | 312/194 |
| 5,443,311 A | | 8/1995 | Kadlecek |
| 5,452,531 A | | 9/1995 | Graville et al. |
| 5,497,878 A | | 3/1996 | Sandonato |
| 5,927,213 A | * | 7/1999 | Leday ................... A47B 17/02 |
| | | | 108/102 |
| 5,927,839 A | * | 7/1999 | Alfaro ................... A47B 88/90 |
| | | | 312/291 |
| 6,158,829 A | | 12/2000 | Nielson |
| 7,210,722 B2 | | 5/2007 | Bernstein |
| 7,249,812 B2 | * | 7/2007 | Fulop ................... A47F 3/004 |
| | | | 248/220.21 |
| 8,708,435 B2 | * | 4/2014 | Johnson ................ A47B 88/70 |
| | | | 312/330.1 |
| 8,857,927 B2 | * | 10/2014 | Johnson ................ A47B 88/70 |
| | | | 312/301 |
| 9,004,455 B2 | | 4/2015 | Falcon |
| 9,173,488 B1 | * | 11/2015 | Bello .................... A47B 88/70 |
| 9,474,362 B2 | * | 10/2016 | Woracek ............. A47B 83/045 |

* cited by examiner

MULTIPLE WORK SURFACE PULLOUT UNIT

CLAIM OF PRIORITY

This patent application claims priority of U.S. Provisional Patent Application 62/386,939 filed Dec. 17, 2015, which Provisional Patent Application is hereby incorporated in its entirety.

FIELD OF THE INVENTION

The invention is directed generally to the field of desk, work, and non-furniture cabinetry or work surfaces, and accessories and add-ons for such. More specifically it is directed to a unique pullout device that supports performance of two or more work operations or work activities in a single compact device affording greater utility, convenience, and options for placement. Specifically it is directed to a single unit comprising multiple work surfaces that are stored or docked within the space allocated for the device and pulled-out, or deployed, when needed for a specific work activity or general use.

BACKGROUND

Consumer demand for sophisticated, practical solutions affording greater functionality and convenience is increasing across a broad market front. Focus on the kitchen to reduce kitchen drudgery and simplify kitchen tasks has a longer history, but bathrooms, laundry rooms, garages, workshops, and commercial facilities are now receiving the same attention for efficiency and convenience. Most obvious and most prolific in this market are initiatives to address storage issues, making shelves and drawers pull, roll, slide and otherwise appear from increasingly obscure locations in increasingly complex configurations. Less developed but just as desirable are products that simplify common tasks and conveniently place devices in support of work activities directly in the work zone where the activity is performed. The difference between these two applications, storage and work surfaces, can be subtle. Both have a storage aspect to their design in that, even in a work surface, the device is often required to store away neatly and accomplish the goals of convenience and efficient space usage. However, in most work surfaces, the installation space must be specifically sized and allocated for the task; whereas, in a storage application, often a solution can be selected to fit whatever space is available. It is more critical in a work surface that dynamic loads associated with the task are evaluated adequately and components be sized and selected to withstand the inherently more significant loading conditions. Although not impossible, it is difficult to convert a common storage application to a work surface and vice versa while also satisfying other requirements of good design.

PRIOR ART

The ready-made cabinet industry, private designers, and manufacturers have made significant strides in utilizing space efficiently and achieving greater convenience in homes, offices, and businesses. In part the improvement comes from the design and manufacture of a variety of hinge and related hardware devices that allow pull and swing-out convenience of shelves positioned in otherwise inconveniently deep, hard to reach corner areas beneath countertops (as well as other surfaces) or similarly simplify access to overhead storage areas. Most significant of these hardware innovations is arguably the full-extension ball-bearing linear slide. The linear slide has been applied broadly, and numerous innovations have resulted from such applications including a broad spectrum of pullout devices employing linear slides to expose and present items conveniently to the consumer. Pullouts, as these products are commonly called, are at the center of the modern trend to squeeze usefulness out of every nook and cranny and strain for greater convenience. Akin to these efforts is the effort to streamline and incorporate fixtures supporting work activities subtly, effectively, and conveniently into cabinets and furniture and other fixtures or furnishings for business, home, and factory, i.e. work surfaces. While these two applications share common hardware, components, and concepts, work surfaces take on the added consideration of dynamic loads, i.e. loads resulting from movement rather than simply static weight bearing, and product development in this area has been active, but not as robust and not as significant. A general explanation for this includes the limitations that fixtures to support work activities also inherently require more space and just cannot be accommodated or vie for space where competing uses have better developed solutions.

A brief review of the field identifies two major areas; storage considerations and unique work surfaces. Note in the following, mention of a specific brand, model, manufacturer, or supplier does not constitute an endorsement; nor does omission constitute any criticism.

A simple search of the Internet provides a wide array of manufacturers and hardware suppliers of products related to storage/space utilization and work surfaces. Telephone and related business directories and advertisements suggest an enormous commercial interest with focus on homeowners in the field of the present invention, see for example, "USA CABINETHARDWARE.com". For a more specific product example, Lazy Susan cabinets have enhanced space use in corners, under corner tops and other inconvenient, difficult to reach spaces. A full array of these rotating shelves in shapes from traditional circular shapes to kidney shaped and semi-circular configurations is available at "www.kitchensources.com" on the Internet.

Commercial outlets that are frequently grouped as "big box stores" have a variety of space saving cabinets, shelves, and counter units with cupboards and shelves. For example, Wal-Mart retail outlets have, among other items, ready-made kitchen and bath shelves and cabinets designed to utilize waste space around various fixtures. Local Lowes Home Improvement Stores (Lowe's Companies, Mooresville, N.C., USA) have planning/design services, many ready-made counters, shelves, and cabinets, and hinges and slides and related hardware for installation of custom made or do-it-yourself projects to improve space utilization. Home Depot is another "big box store" with a wide section of ready-made cabinetry (such as KraftMaid Cabinetry manufactured by Masco Cabinet, LLC, Middlefield, Ohio 44062, a Masco Company, LLC), plus a more than adequate range of cabinetry hardware for and instruction programs for do-it-yourself projects.

The following examples of issued US patents trace, first, the development of space saving storage followed by developments in the area of work surfaces.

Arguably, the watershed development in this line of design is the invention of the full-extension ball-bearing linear slide as recorded in U.S. Pat. No. 4,370,007 to Fler on Jan. 25, 1983 titled "Sliding Drawer Suspension". This patent embodies the basic element from which a plethora of products have risen and is a basic element within the invention. It is also evident that invention prior to this date employing similar components cannot rise to the level of functionality, reliability, structural strength, and other design objectives that can be achieved with the introduction of this invention. It, of course, has been improved many times and specialized variations have emerged since its inception now over 40 years ago, and this strengthens its seminal role in design of devices addressing efficient, effective space utilization and convenience.

U.S. Pat. No. 5,443,311 issued Aug. 22, 1995 to Kedlecek titled "Pull-out Work Platform for Drawer" teaches a work platform nested in a drawer and smaller than the interior dimensions of the drawer so the platform can be moved "forward" in the drawer for use, or removed from the drawer. The device also features a lid that opens and closes with the drawer and protects the work platform.

U.S. Pat. No. 4,993,786 issued Feb. 19, 1991 to De Giulio titled "Method and Apparatus for Retrofitting a Drawer with a Multiple Level Storage Tray" proposes a drawer insert which installs an additional drawer within a donor drawer for the purpose of utensil or small item storage. When the base drawer is opened, the inserted drawer is free to slide partially back into the drawer recess on a roller and track assembly.

U.S. Pat. No. 5,497,878 titled "Work Surface Extensions for Tool Storage Units", was issued to Sandonato on Mar. 12, 1996 and teaches a work surface housing units disposed between a pair of toolboxes. The general purpose, to provide work surface extensions for tool storage units has also been differently addressed in earlier US patents.

Nielsen received U.S. Pat. No. 6,158,829 titled "Computer Keyboard Enclosure with Work Surface" on Dec. 12, 2000. The technology describes a protective closure for a computer table that may be converted in more than one configuration to a writing surface.

Bernstein, et al. received U.S. Pat. No. 7,210,722 titled "Pull-out Desk Unit for Mobile Vehicles" on May 1, 2007. The desk unit features a reversible top on both sides of which can be used, one for writing and similar tasks, and the reverse side for eating. The top is supported by cantilevers thereby eliminating the need for any legs that take space and may prove to be a nuisance in the vehicle.

For historical interest rather than relevance to the current disclosure, see also U.S. Pat. No. 468,929 issued to Cochrane on Feb. 16, 1892 and titled "Adjustable Drawing Table or Desk"; U.S. Pat. No. 562,727 issued Jun. 23, 1896 to Hooper and titled "Kitchen Cabinet" with a variety of drawers, bins, shelves and cupboards, also, Nielsen, U.S. Pat. No. 1,300,759 issued Apr. 15, 1919 and disclosing a dressmakers or milliners table.

Specific to the topic of work surfaces, there is limited patent activity. There have been multiple patents issued for devices that by means of various mechanical arms, springs, and cantilever measures move equipment from a stored position to a suitable position for use. These include U.S. Pat. No. 2,543,485 to Briggs dated Feb. 27, 1951 titled "Suspension for Cabinet Ironers", U.S. Pat. No. 2,822,229 to Carlson dated Feb. 4, 1958 titled "Swinging Shelf Support", and U.S. Pat. No. 3,401,992 to L. P. Benson et al on Sep. 17, 1968 titled "Subpanel Elevating Means for Apparatus Cabinets". U.S. Pat. No. 9,004,455 issued Apr. 14, 2015 to Falcon entitled "Appliance Lift", discloses such a device and an approach for the installation of such devices. The drawings presented in the disclosure show a heavy and well reinforced device to withstand the forces it may incur while in service which would be reasonable for devices expected to function in actual work activities. The work activity of ironing has received the attention of several inventors over several decades. U.S. Pat. No. 2,025,649 to Depoy issued Dec. 24, 1935 titled "Laundry Cabinet" describes a cabinet for domestic laundry work, as does U.S. Pat. No. 5,452,531 to Graville et al dated Sep. 26, 1995 titled "Cabinet and Latchless Adjustable Ironing Board".

PURPOSES AND GOALS OF THE INVENTION

A first purpose or objective of the multiple work surface pullout work surface unit is a unit that permits efficient, productive use of space that otherwise is unused or under utilized.

A second purpose or objective of the multiple work surface pullout unit is a unit with multiple and potentially simultaneous uses of space that is otherwise unused or underutilized.

A third purpose or objective of the multiple work surface pullout unit is a unique configuration of slide (travel) elements such that only the secondary work surface is physically connected to the primary slides.

A fourth purpose or objective of the multiple work surface unit is a unique orientation of the primary and secondary slides such that regardless of the use of the primary work surface, the secondary work surface or both work surfaces, load is transferred to the primary slides and load on the secondary slides is marginalized.

A fifth purpose and objective of the multiple work surface pullout unit is a unit that optimizes the area of the front face of the cabinet or comparable structure in which the unit is installed and by which it is at least in part supported.

A sixth purpose and objective of the multiple work surface pullout unit is increasing space use efficiency by overlapping slides, thereby allowing physical support of at least two work surfaces to be accomplished in the space marginally required to support a single work surface.

These and other beneficial purposes, objectives and goals can be accomplished by a multiple work surface pullout unit as summarized in the following brief description and more fully discussed and explained by reference to the Figures and text of the Examples of Best Modes.

BRIEF DESCRIPTION OF THE INVENTION

A multiple work surface pullout comprises more than one retractable planar work surface in a single unit accomplished with a unique arrangement of components, unique use of space, and an economy of scale and parts so as to allow multiple surfaces to operate in a space marginally greater than the space required for one. The basic multiple work surface pullout has four pairs of specific functional elements or parts described below as separate parts: a left and a right rail, each a mirror image of the other with opposite first and second vertical faces, at least a primary and a secondary work surface, two pairs of slides, a pair of larger primary slides and a pair of secondary slides. The walls and floor of the facility provide basic structural support for a multiple work surface pullout unit with additional support as necessary for the individual installation; the left and right rails are oriented so that the first face of each rail faces inward, toward the other member of the pair of rails; the secondary work surface spans the distance between the two rails and a mating edge on the secondary work surface is attached to the first face of each rail, left and right; the fixed ends of the pair of secondary slides are also attached to the first face of each rail the primary work surface spans between and is attached to the extending end of the two secondary slides; thus, the primary work surface translates with the action of the secondary slides; in this orientation, the primary work surface will translate back, toward/into the storage cavity of the support structure in which the entire device is mounted and stored when the secondary slides extend; the secondary face of each rail is oriented outward, towards the support structure; the extending end of each primary slide is attached to the second face of one of each rails, right and left; the fixed end of each primary slide is connected to the support structure; in this configuration, the entire device extends as a unit from the support structure as the primary slides extend and loads applied to either work surface while in use are countered by the support structure and the primary slides; the secondary slides are retracted when work loads are applied (basically, a no load condition) and shielded within the support structure cavity when extended to expose the secondary work surface for its activities, a characteristic of the invention which allows for smaller, lighter components and significant space savings; generally, work surfaces are planar, with minimal edges or sides, but designed ergonomically and given features so as to support specific activities. One skilled in the art recognizes that the above described four parts may be combined in manufacturing without altering the scope or the to intent of the disclosure or of the appended claims, and that such combinations are anticipated by both this disclosure and the applied claims.

EXAMPLES: BEST MODES

The work surface comprises a generally rectangular structure generally orientated as a horizontal plane with length, width, and thickness dimensions. A work surface is often designed with specific features to support specific activities, but it also can be as simple as a tabletop-like surface. Construction and design are such that loading from activities can be withstood by the supporting structure of the work surface at an elevation and configuration that commonly simplifies tasks to be performed on the work surface and/or promote ergonomic conditions for the task for which it is designed or installed. A pullout work surface is a work surface that can be extended and retracted. Often a pullout extends from and retracts into a housing or home station (often referred to as a dock position or docking station). In this configuration, docked refers to the pullout in a fully retracted position and undocked refers to its position otherwise. Generally the extending and retracting of the work surface allow it to be un-obstructive and/or out of sight when not required and handily available otherwise, or the translation ability of the pullout may simply enable repositioning. A multiple work surface pullout unit 101, see FIG. 2C, comprises more that one work surface in a pullout configuration as the name implies. Applications and design determine the number of work surfaces in a multiple work surface pullout unit.

Figure 2A:
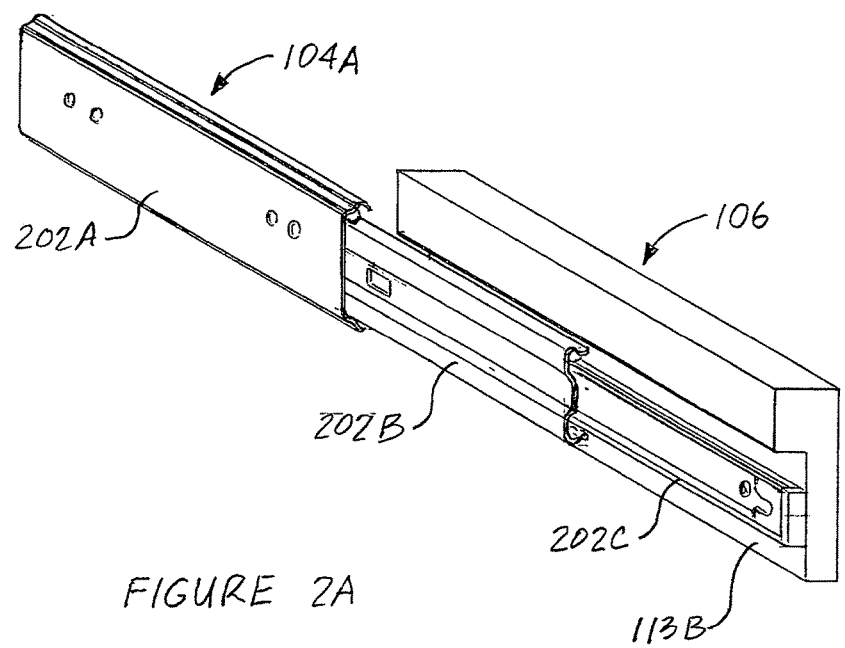
Figure 2B:
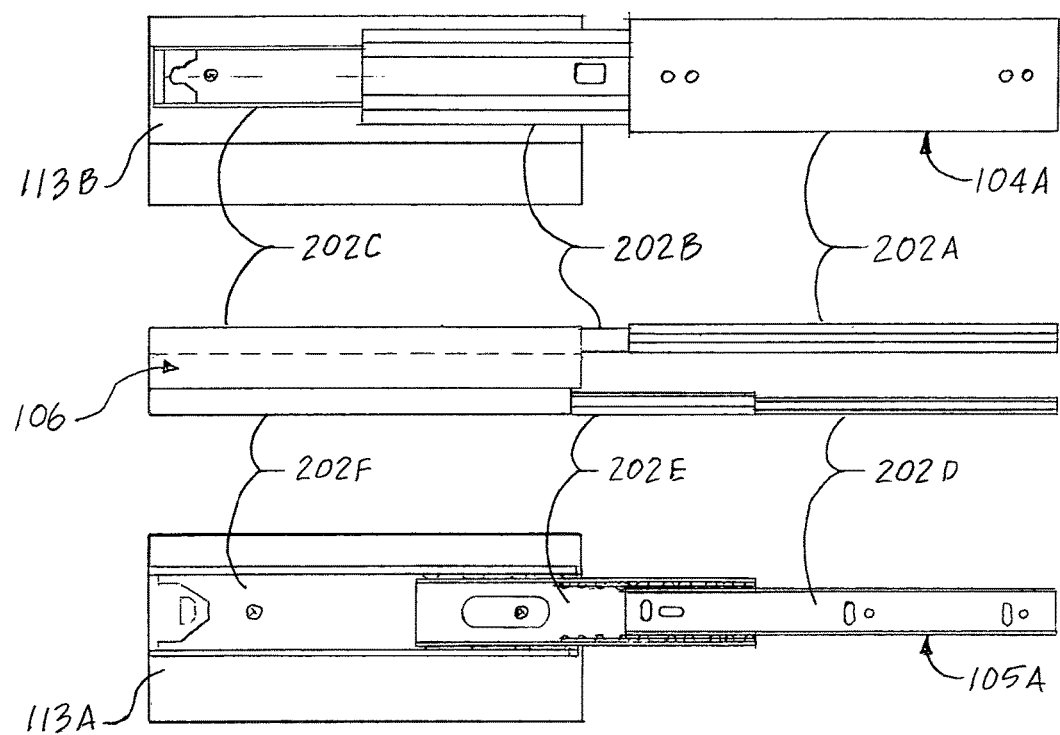
Figure 2C:
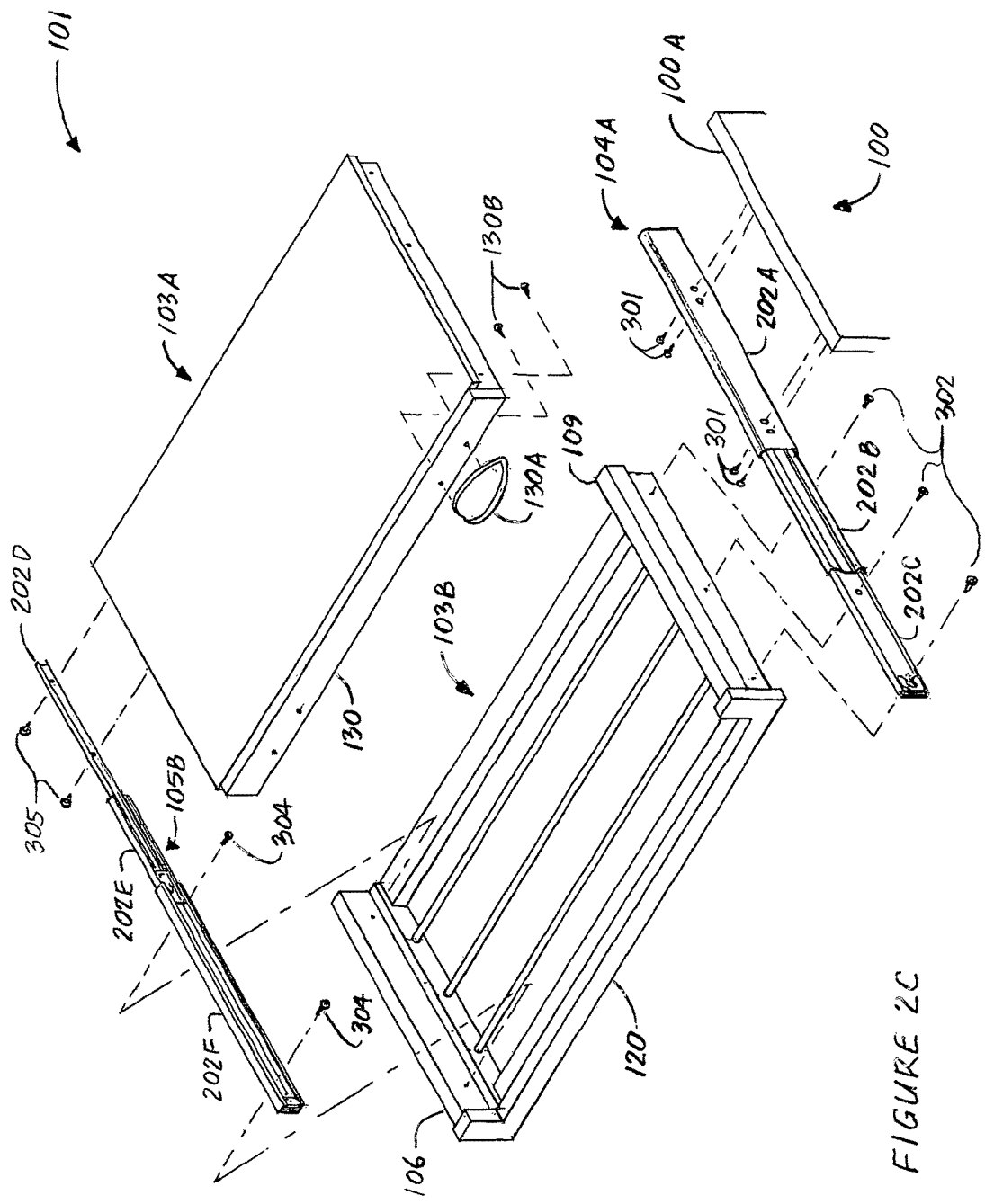

In addition to floors and walls, existing cabinets and counters provide the structural support 100 for the multiple work surface pullout (the support frame 100A) and play an important structural/functional role, see FIG. 2C. In some applications, the structural support may be specifically constructed, freestanding or portable with appropriate anchors provided at the point of use as determined by a specific application. The multiple work surface pullout 101 is adaptable to a wide array of pre-built and built-in cabinets and counters as well as to custom built cabinetry. The anticipated use of multiple work surface pullout devices in remodeling simplifies building simple support structures 100. Multiple work surface pullout finds increasing use in small apartments, offices and even in trailers and camping vehicles.

Figure 3:
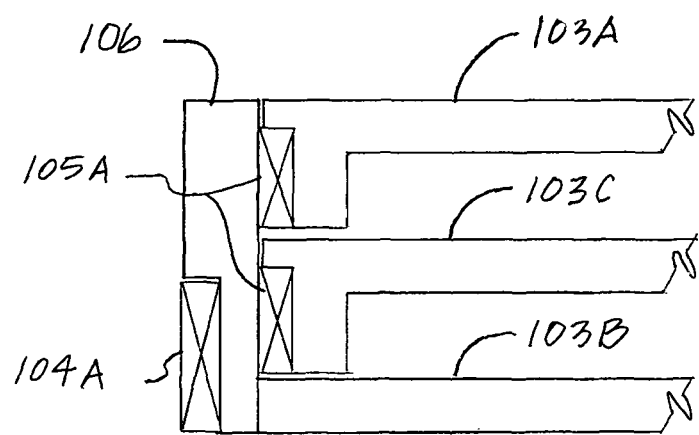

The multiple work surface pullout 101 unit, FIG. 2C, comprises at least eight major, functional units, in addition to the support elements which may be combined in manufacturing elements: a right 109 and left 106 rail, the primary 103A and secondary 103B work surfaces; a pair of primary slides 104A and 104B, and a pair of secondary slides 105A and 105B. In this configuration, the multiple work surface pullout unit will contain two work surfaces. Each additional work surface in a unit requires an additional pair of rails, an additional pair of secondary slides, and an additional work surface. A person skilled in the art will recognize that this pattern can be repeated to add more work surfaces. FIG. 3 provides a sectional diagram of a multiple surface pullout unit with three work surfaces, 103A, 103B, sand 103C, primary, second primary, and secondary, respectively.

Figure 1A:
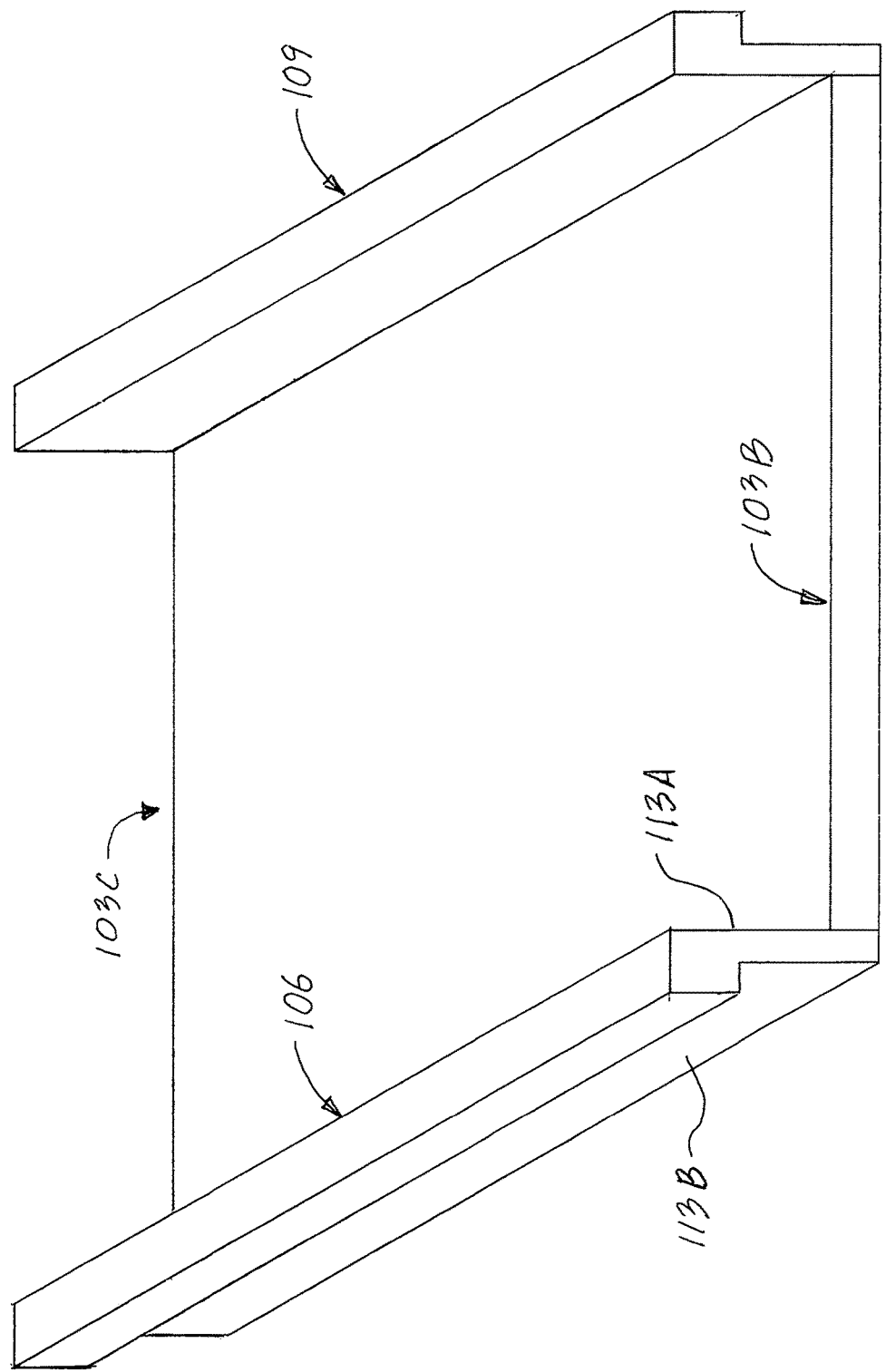
FIG. 1A A perspective diagram showing secondary work surface and rails
FIG. 1B A diagram showing both sides of a single rail
FIG. 2A An illustration of primary slide attachment to a rail
FIG. 2B Comparison of attachment of primary slide and secondary slide to a rail
FIG. 2C A schematic diagram of device showing one primary and one secondary slide and relation among major components of the device
FIG. 3 Illustration of the multiple work surface pullout having more than two work surfaces
Figure 1B:
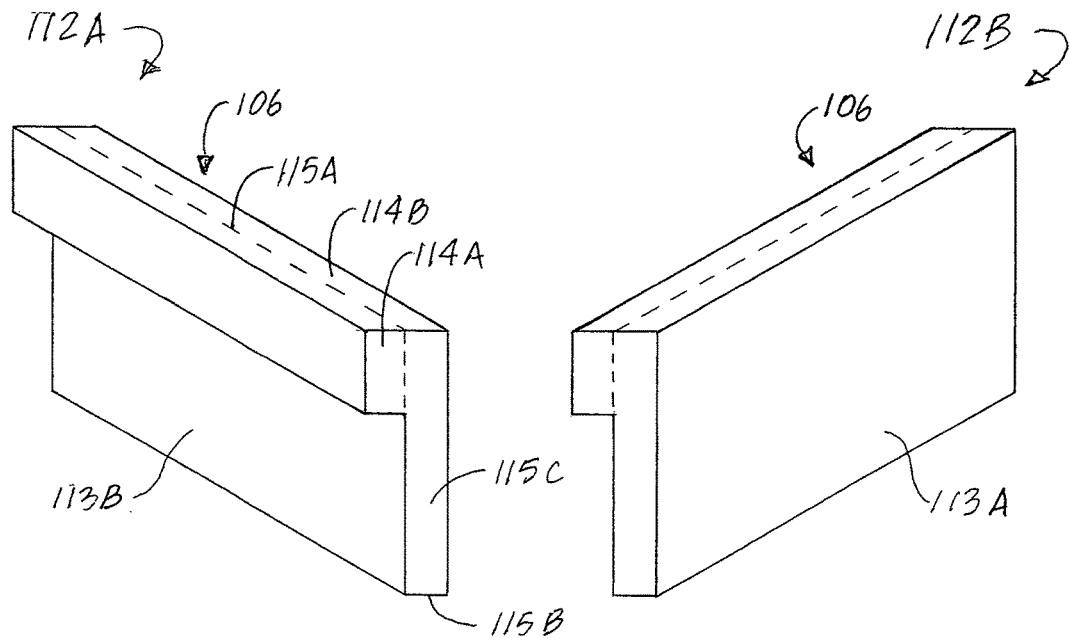

The right 109 and left 106 rails FIG. 1A generally establish the depth of the device and provide surfaces on which to locate and to mount the other components of the invention. The first (right side) and second (left side) rails 106 and 109, respectively, are structurally identical, but mirrored. FIG. 1B illustrates the various parts and surfaces common to both the first rail 106 and to the second rail 109, and FIG. 1B further provides two views at opposing angles, arrows 112A and 112B. As one skilled in the art recognizes, comparable views of the second rail 109 are readily derived from views 112A and 112B, FIG. 1B and omitting such views does not affect the scope or validity of the claimed invention. In some applications it may be acceptable for the designer to incorporate the functions of the mechanical slides in the design of the rails themselves or visa-a-versa. This modification, per se, does not affect the scope and validity of the claimed invention.

In FIG. 1B, views indicated by arrows 112A and 112B, the rail has a top left surface 115A, a bottom surface 115B, and a front face 115C noted here for identification purposes, only. View 112A shows the second face 113B of rail 106 and view 112B the first right face 113A. The top may be divided into two segments: the top 114B and the overhang 114A. The distinction of the sections top is not critical, and the overhang 114A may be excluded in some designs; however, the overhang 114A may be a common feature for aesthetic appeal and to promote cleanliness around moving parts. From view 112B, first face 113A is the inner face of rail 106, the secondary mounting surface. The first face 113A is the surface to which the secondary work surface 103B is anchored. Commonly, the secondary work surface 103B would be mounted so that the bottom of the secondary work surface 103B is flush with the bottom surface 115B. The length of the rails 106 and 109 depends on the dimensions of the secondary work surface which commonly are the same dimension. FIG. 1A shows the assembly 103C comprising the secondary work surface 103B and the two rails 106 (second, left) and 109 (first, right) rails, respectively. In many cases, assembly 103C will define the external dimensions of the multiple work surface pullout unit 101; however, dimensions depend on many design choices. In many cases, all components (with allowances for clearances and fit issues) fit within the volume defined by the assembly of rails 106 and 109 and the secondary work surface 103B.

Left rail 106, first mounting face 113A is also the mounting surface for mechanical mounting slides (secondary slides 105A and 105B) that allow the movement and positioning of the primary work surface 103A FIG. 1A. Commonly, secondary slides 105A and 105B are attached to the first face 113A of rail 106 and rail 109 and to the edges of primary work surface 103A such that the top of primary work surface 103A is flush with the surface 115A, of rail 106, and the front edge of the primary work surface 103A is flush with surface 115C and 106, when secondary slides 105A and 105B are fully retracted. From view arrow 112A, second face 113B is the outer face of rail 106, or the primary slide mounting surface. The second face 113B is the mounting surface for mechanical slides, primary slides 104A and 104B, that allow the movement and positioning of the multiple work surface pullout unit 101 within the external frame or support structure 100. Primary slides 104A and 104B are installed on the second face 113B, left rail 106 and right rail 109, so that the front face of the multiple work surface pullout unit 101 matches properly with the front face of structural support 100 per design requirements and edges around the front face of the multiple work surface pullout unit 101 match properly and have running clearance with structural support 100 as prescribed by design requirements when the primary slides are fully retracted.

As one skilled in the art recognizes, various joint designs, joining methods, and configurations may be employed in attaching components to rails 106 and 109 FIG. 1A; omitting such details does not affect the validity of the invention or alter the scope of the appended claims. Similarly, manufacturing methods that may mold, sculpt, or additively build, or otherwise produce the assembly of rails 106 and 109 and secondary work surface 103B into a single part also do not affect the scope or intent of the appended claims or the validity of the invention Slide design, and selection and configuration also do not affect the intent of the invention or its validity, or the scope of intent of the appended claims. For aesthetic purposes, a face 120 may be attached between the rails 106 and 109, and a separate face 130A and pulls with hardware 130B added to the front edge of the primary work surface 103A. Fasteners (screws and adhesives), selection of joints or design, and choices of manufacturing materials, methods or processes are suggested only by way of example, not as any limitation.

The members of each pair of slides are matched for operation (functional identical), and the pairs of slides are structurally and dimensionally different. Primary slides 104A and 104B are sized to support the loads to be applied to both work surfaces, 103A and 103B, when they are in service. All forces applied to either work surface, 103A or 103B, either separately or simultaneously are transferred to the support structure 100 by primary slides 104A and 104B. Primary slides 104A and 104B must be sized for these load conditions. Additionally, primary slides 104A and 104B would normally be specified as full extension or as slightly over-extension slides to prevent any overhanging features of the structure 100 from interfering with operation of the invention. The installation location of primary slides 104A and 104B on the outer edge of the multiple work surface pullout unit 101 (rails 106 and 109 on second face 113B) is intentional to prevent their size from impacting the overall height of the invention. At said installation location, in most cases, the assembly of other components will require greater height than the primary slides 104A and 104B, themselves. In contrast to primary slides 104A and 104B, secondary slides 105A and 105B are virtually non-load bearing. Secondary slides 105A and 105B are attached to primary work surface 103A. When primary work surface 103A is in service, secondary slides 105A and 105B are not extended. Secondary slides 105A and 105B can only be loaded in their retracted position. When the secondary slides 105A and 105B are in their extended position, primary work surface 103A is inaccessibly covered and sheltered by the support structure 100. Secondary slides 105A and 105B need only be specified to perform the function of translation. This is a significant feature in a design of a work surface to which dynamic forces will be applied and in which the loading conditions are not a significant consideration in selection of slides. In most cases, secondary slides 105A and 105B are lightweight, full extension slides. Various design options involving the sizing and orientation of slides does not affect the scope, intent, or validity of the claimed invention. The slide differences and configuration between the two pairs of slides allows a key and unique feature of the multiple work surface pullout unit, the offset configuration and dimensional differences between the pairs of slides allow a design in which slides may overlap in common horizontal space thereby permitting the invention to perform its multiple purposes within a space marginally greater than what would be required for a device designed for a single purpose.

Primary slides 104A and 104B and secondary slides 105A and 105B are different in installation and orientation. See FIG. 2B for comparison. One skilled in the art recognizes that slides are widely available in a variety of sizes for both "standard" and "custom" purposes in the furniture and cabinet manufacturing and supply industries. Full extension slides, recommended, but not required in the invention, double their retracted length when extended and are composed of at least three sections. FIG. 2A illustrates a generic, full extension slide positioned as a primary slide 104A on rail 106 with a portion of the second face 113B visible with the three sections of the slide; base section, middle section, and end section. Note FIG. 2A in which primary slide 104A is illustrated showing the three slide sections, the base section 202A, the middle section 202B, and the end section 202C in their sequential relationship with rail 106. The slide is fully extended. When retracted, the end section 202C is moved into the open center of the middle section 202B, and the middle section 202B with the encased end section 202C is pulled into the open center of the base section 202A in what is recognized and described as a nested configuration. As the slides extend and retract, components connected to them extend and retract reciprocally. FIG. 2B illustrates the arrangement of the three slide sections for a primary slide 104A and a secondary slide 105A connected respectively to the second face 113B and the first face 113A of rail 106. The primary slide 104A is structured as in FIG. 2A with the same reference numbers, base section 202A, middle section 202B, and end section 202C. The secondary slide 105A and its slide sections are also shown in their relationship to rail 106 in FIG. 2B. The base section 202F, middle section 202E, and end section 202D of the secondary slide 105A are shown juxtaposed respectively to the end section 202C, middle section 202B, and base section 202A of primary slide 104A. This same pattern applies to the slide attached to the left rail 109 which therefore is not illustrated. The connection of right rail 106 and left rail 109 to the secondary work surface 103B is described in text above explaining FIG. 1A.

The reversal and the resulting pattern of connection among slide segments and rails and with the support structure 100A of the external frame or support 100 allows a key, unique feature of the multiple work surface pullout unit to function; when the upper, primary work surface 103A FIG. 2C is pulled out, the lower, secondary work surface 103B is also extended outward beneath it; however, the upper, primary work surface can be retracted into the external frame or support 100 without moving the secondary work surface 103B, thus exposing the secondary work surface 103B for use. The distinction made in FIG. 2B is that the end section 202C of the primary slide 104A is attached to the second face 113E of rail 106, and to the same end of rail 106, the base end 202F of the secondary slide 105A is attached to the first face 113A. In short, the orientation of primary slides 104A and 104B and secondary slides 105A and 105B are reversed, end-to-end in the invention. Using FIG. 2B to complete the slide installation, the base end 202A of the primary slide 104A is fastened to the side of structural support 100 and the extended end 202D of the secondary slide 105A is attached to assembly 103C.

The pattern of connections for all components is shown in FIG. 2C. The base section 202A of each primary slide 104A is connected 301 only to the support structure 100A of the external frame or support 100, regardless of the specific construction of the support (wall/specific frame/or support), and the end section 202C is connected 302 to the second face of the right rail 109 adjoining the secondary work surface 103B (shown as a drying rack, by way of example). The pattern of connection is the same for both primary slides; only one primary slide 104A is illustrated in FIG. 2C. The base section 202F of each secondary slide 105A is connected 304 to the first face of the left rail 106, and the end section 202D is connected 305 to the primary work surface 103A. The pattern of connection is the same for both secondary slides; only one secondary slide 105A is illustrated is in FIG. 2C. Connections are, by way of example, by means of wood screws, adhesives, or as dictated by material selection.

When multiple work surface pullout unit 101 is docked, the front face of the multiple work surface pullout unit is flush with the front face of the support structure 100 in most designs and installations. When pulled from its docked position, primary slide 104A and primary slide 104B extend, the entire multiple work surface pullout unit 101 extends and the primary work surface 103A is exposed for use. Tasks (work) can be performed on the primary work surface 103A as desired/required. The secondary work surface 103B may be exposed by "bumping" the primary work surface 103A backwards towards the docking cavity. The secondary slides 105A and 105B extend, retracting the primary work surface 103A back into the docking cavity thereby exposing the secondary work surface 103B. In many cases, the design allows convenient, coordinated use of both work surfaces.

FIG. 2C illustrates a basic structure/arrangement of the primary and secondary work surfaces. Both the primary and secondary work surfaces may be adapted for very specific tasks wherein proximity/convenience of the work surfaces to each other is desirable in the application of the invention, or either the primary or secondary may be adapted to different tasks wherein space utilization is a key benefit, or the primary or secondary work surfaces may be adapted to perform divergent tasks to simply enable performing multiple activities in the space normally allocated for one. All work surfaces are interchangeable and naming and numbering conventions used herein to explain the design of the invention do not indicate order of use or give priority. Parts from the several modes illustrated may be combined to yield additional unique combinations and modes. Means of accomplishing tertiary work surfaces and more are anticipated.

What I claim is:

1. A multiple work surface pullout unit comprising at least a primary and a secondary retractable work surface, the secondary retractable work surface defines a rack comprising a plurality of spaced rods, a pair of primary slides and a pair of secondary slides wherein the members of said primary pair of slides and of said secondary pair of slides are arranged and connected so that the secondary work surface is fixed to a corresponding member of said pair of primary slides and allowing said secondary slides to at least move in a direction opposite a movement of said primary slides, and said primary work surface is fitted and attached functionally between said pair of secondary slides to operate above said secondary work surface wherein said pair of primary slides install in an opening within a functional support structure which defines a space in which said multiple work surface pullout unit may be stored in a docking cavity or area when not in use and may be extended there from for a designated use, furthermore, by this arrangement of components, allowing said primary work surface to be docked independent of the position of said secondary work surface, and furthermore, wherein, the arrangement and connection of the members of said pair of primary slides and of members of said pair of secondary slides and of said at least a primary and secondary retractable work surface results in a configuration in which the application of working loads on said primary work surface when it is exposed fully for use and, resultantly, on said pair of secondary slides can occur while said pair of secondary slides are not extended fully, in a rest position where loading conditions on said pair of secondary slides can be marginalized.

2. The device of claim 1 wherein additional utility is achieved by rotating, hinging, reversing, folding, expanding, interchanging, exchanging, at least one element of at least one work surface.

3. The device of claim 1 wherein said primary work surface comprises a flat planar surface and wherein said primary work surface is also adapted to other configurations conducive to different tasks without adversely affecting the use as a flat planar surface; and furthermore, wherein said secondary work surface is adapted to serve as a hanging rack.

4. The multiple surface pullout unit of claim 3 wherein the secondary work surface defines an open area below the plurality of spaced rods.

5. A multiple work surface pullout unit comprising at least a primary and a secondary retractable work surface, the secondary retractable work surface defines a drying rack comprising a plurality of spaced rods, a pair of primary slides and a pair of secondary slides wherein the members of said primary pair of slides and of said secondary pair of slides are arranged and connected such that only said primary retractable work surface is functionally connected to the members of said pair of secondary slides, and further wherein each member of said pair of primary slides is functionally connected to a member of said pair of secondary slides; and further wherein when said primary retractable work surface is extended from its storage docked position and positioned for use, said secondary retractable work surface is also extended from its storage docked position; however said primary retractable work surface can be redocked and said secondary retractable work surface remain extended for work purposes.

6. The multiple surface pullout unit of claim 5 wherein the secondary work surface defines an open area below the plurality of spaced rods.

* * * * *